(12) United States Patent
Nakata et al.

(10) Patent No.: US 10,574,841 B2
(45) Date of Patent: Feb. 25, 2020

(54) INFORMATION PROCESSING APPARATUS, CONTROL METHOD, AND STORAGE MEDIUM

(71) Applicant: CANON KABUSHIKI KAISHA, Tokyo (JP)

(72) Inventors: Takeshi Nakata, Kawasaki (JP); Yumiko Saito, Tokyo (JP); Tatsuya Hisatomi, Tokyo (JP); Kouhei Kizu, Tokyo (JP); Yu Taguchi, Inagi (JP); Kazuhiro Watanabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/134,687

(22) Filed: Sep. 18, 2018

(65) Prior Publication Data

US 2019/0098152 A1    Mar. 28, 2019

(30) Foreign Application Priority Data

Sep. 27, 2017    (JP) .................................. 2017-186612

(51) Int. Cl.
*H04N 1/00* (2006.01)
*G06F 3/0481* (2013.01)
(Continued)

(52) U.S. Cl.
CPC ....... *H04N 1/00411* (2013.01); *G06F 3/0482* (2013.01); *G06F 3/0488* (2013.01);
(Continued)

(58) Field of Classification Search
CPC ............. H04N 1/00411; G06F 3/04817; G06F 3/04883

See application file for complete search history.

(56) References Cited

U.S. PATENT DOCUMENTS

2008/0139896 A1* 6/2008 Baumgart ........... G06F 3/04817
                                                        600/300
2010/0088634 A1* 4/2010 Tsuruta ................. G06F 3/0481
                                                        715/800

(Continued)

FOREIGN PATENT DOCUMENTS

JP    2009-521753 A    6/2009
JP    2014-115787 A    6/2014

*Primary Examiner* — Iriana Cruz
(74) *Attorney, Agent, or Firm* — Canon USA, Inc., IP Division

(57) ABSTRACT

An information processing apparatus includes a display control unit that performs control to display, on a touch display, a first graphical user interface (GUI) corresponding to a task and to display a second GUI different from the first GUI in a case where a touch-down operation on the first GUI has been performed, and to perform control, in a case where a continuing operation has started following the touch-down operation, to sequentially display a plurality of setting values different in type with respect to the task based on an amount of continuation of the continuing operation before the continuing operation is completed, and a task control unit that performs control to execute the task in a case where the continuing operation has completed and not to execute the task in a case where a touch-up operation has been performed before the continuing operation is completed.

20 Claims, 15 Drawing Sheets

(51) Int. Cl.
*G06F 3/0482* (2013.01)
*G06F 3/0488* (2013.01)
*G06F 3/0484* (2013.01)

(52) U.S. Cl.
CPC ...... *G06F 3/04817* (2013.01); *G06F 3/04847* (2013.01); *G06F 3/04883* (2013.01)

(56) References Cited

U.S. PATENT DOCUMENTS

2015/0052464 A1\* 2/2015 Chen .................. G06F 3/04817
 715/765
2018/0249022 A1\* 8/2018 Webb .................. H04N 1/0097

\* cited by examiner

INFORMATION PROCESSING APPARATUS, CONTROL METHOD, AND STORAGE MEDIUM

BACKGROUND

Field

Aspects of the present disclosure generally relate to an information processing apparatus, a control method, and a storage medium.

Description of the Related Art

Heretofore, apparatuses that accept an instruction for execution of a task in response to a user operation performed on a touch display in which a touch input unit (touch panel) and a display unit (display) are configured in an integral manner have appeared. Here, the term "task" refers to a unit of work or job to be performed by the function of an apparatus. In recent years, an apparatus that enables an instruction for execution of a task in a given apparatus to be issued in response to a user operation performed on a tablet terminal connected for communication to the given apparatus has also appeared. The touch display can timely display various functions or pieces of information included in an apparatus as a graphical user interface (GUI). Since the user can directly perform a touch operation on the GUI, the touch display enables a manipulated input easily comprehensible and simple for the user.

With respect to a user operation to be performed on a touch display, there is an issue that an unintended contact by the user (including contact other than a finger touch) with the display surface can cause a task to be executed or can cause the content (setting of various factors) of a task to be changed. To address this, Japanese Unexamined Patent Application Publication (Translation of PCT Application) No. 2009-521753 discusses a technique that moves an unlock image displayed on a touch display in response to a user operation and unlocks a device when the unlock image has moved to a predetermined unlock area. Japanese Patent Application Laid-Open No. 2014-115787 also discusses a technique that displays a plurality of icons associated with different processing operations around a touch position on a touch panel and displays another plurality of icons corresponding to the selected icon around the touch position.

In the case of, for example, performing printing with a printer, an instruction for execution of a task may be input with an erroneous setting. For example, an instruction for execution of a task may be input in a state in which the number of copies for printing different from that intended by the user is set.

SUMMARY

Aspects of the present disclosure are generally directed to providing a technique that executes a task intended by the user while, with an efficient and simple operation, preventing the task from being executed in response to a touch unintended by the user.

According to an aspect of the present disclosure, an information processing apparatus includes a touch display, a display control unit configured to perform control to display, on the touch display, a first graphical user interface (GUI) corresponding to a task and to display, on the touch display, a second GUI different from the first GUI in a case where a touch-down operation on the first GUI has been performed, and to perform control, in a case where a continuing operation has started following the touch-down operation, to sequentially display, on the touch display, a plurality of setting values different in type with respect to the task based on an amount of continuation of the continuing operation before the continuing operation is completed, and a task control unit configured to perform control to execute the task in a case where the continuing operation has completed and not to execute the task in a case where a touch-up operation has been performed before the continuing operation is completed.

Further features will become apparent from the following description of exemplary embodiments with reference to the attached drawings.

DESCRIPTION OF THE EMBODIMENTS

Various exemplary embodiments, features, and aspects of the disclosure will be described in detail below with reference to the drawings.

Figure 1:
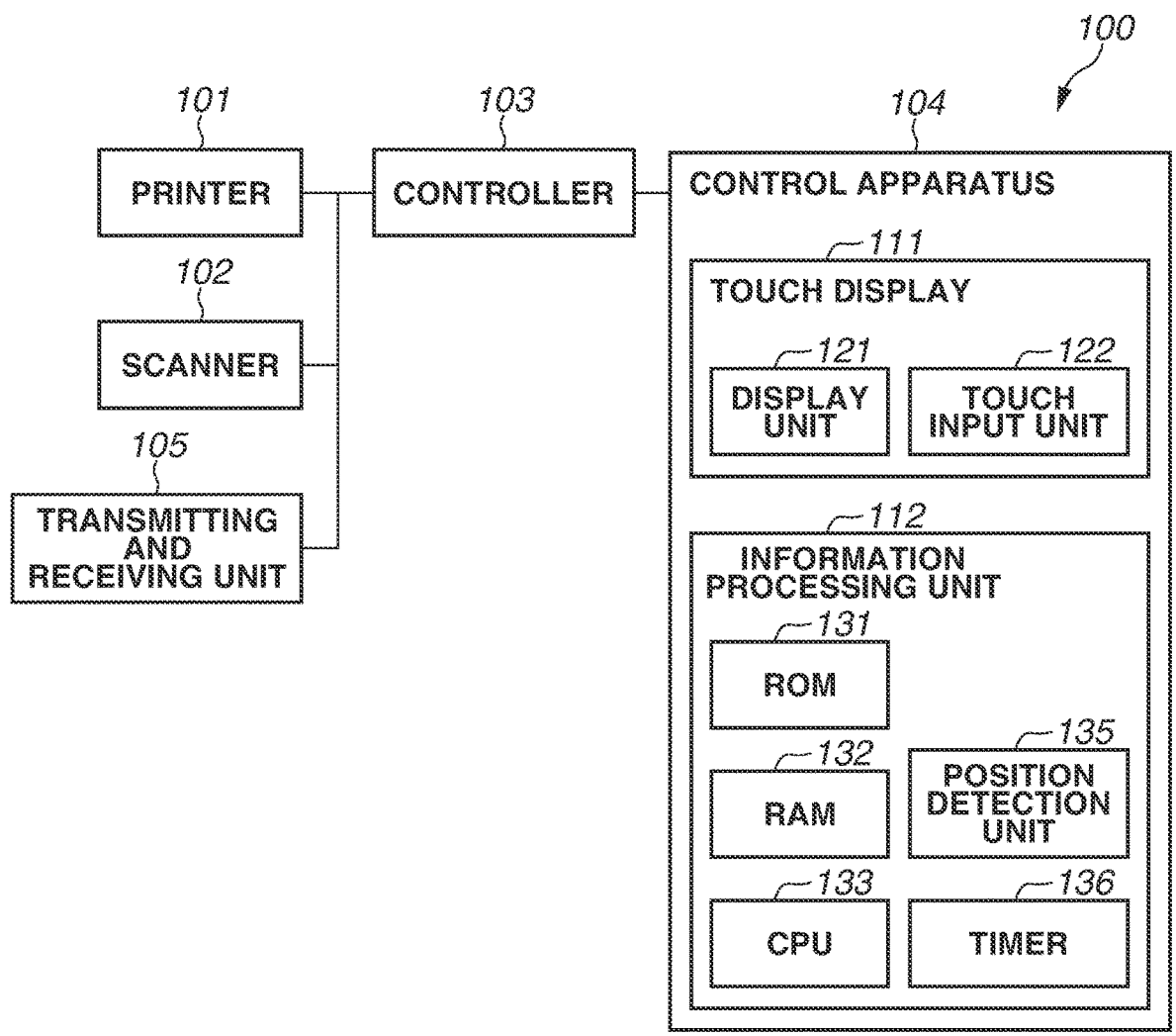
FIG. 1 is a diagram illustrating a multifunction peripheral according to a first exemplary embodiment.

FIG. 1 is a diagram illustrating a multifunction peripheral 100 according to a first exemplary embodiment. The multifunction peripheral 100 includes a printer 101, a scanner 102, a transmitting and receiving unit 105 (including a facsimile function), a controller 103, and a control apparatus 104. Here, the control apparatus 104 is an example of an information processing apparatus. Moreover, the control apparatus 104 includes a touch display 111 and an information processing unit 112. The touch display 111 includes a display unit 121 and a touch input unit 122. The display unit 121 receives data from the information processing unit 112 and outputs (displays) the received data as an image. The touch input unit 122 transmits a touch position of a touch performed by the user to the information processing unit 112.

The information processing unit 112 includes a read-only memory (ROM) 131, a random access memory (RAM) 132, and a central processing unit (CPU) 133. The information processing unit 112 is able to detect the following operations performed on the touch input unit 122:

the operation in which a finger or pen has newly touched the touch input unit 122 (hereinafter referred to as "touch-down");

the operation in which a finger or pen is touching the touch input unit 122 (hereinafter referred to as "touch-on");

the operation in which a finger or pen is moving while touching the touch input unit 122 (hereinafter referred to as "move");

the operation in which a finger or pen, which has been touching the touch input 122, has been separated from the touch input unit 122 (hereinafter referred to as "touch-up"); and the operation in which none is touching the touch input unit 122 (hereinafter referred to as "touch-off").

Furthermore, a combination of one or a plurality of touch operations including move is referred to as a touch gesture.

The information processing unit 112 further includes a position detection unit 135 and a timer 136. Furthermore, in the present exemplary embodiment, the position detection unit 135 and the timer 136 are assumed to be respective independent pieces of hardware. However, as another example, the position detection unit 135 and the timer 136 can be functional blocks which are formed by the CPU 133 reading out a computer program from the ROM 131 and executing the computer program.

The CPU 133 reads out programs and data from the ROM 131 and performs processing using the RAM 132 as a work area memory, thus performing operation control of the control apparatus 104. The CPU 133 receives data sent from the position detection unit 135 and writes information corresponding to the received data into the RAM 132. Moreover, the CPU 133 transmits, to the display unit 121, display image data to be displayed on the display unit 121. Moreover, when completely receiving information required for task processing, the CPU 133 transmits the received information to the controller 103.

The position detection unit 135 detects a touch position of a touch performed by the user on the touch input unit 122, and transmits a result of detection to the CPU 133. The tinter 136 measures a time for which the user is touching a portion on the display screen of the touch input unit 122.

The controller 103 performs operation control of the entire multifunction peripheral 100. Moreover, the controller 103 performs communication with the control apparatus 104 to receive task (work or job to be performed by the function of the multifunction peripheral 100) information that is based on an instruction from the user and to transmit a result of execution or a status of progress of the task. Here, the term "task" refers to a unit of work or job to be performed by the function of the multifunction peripheral 100. Examples of a task to be performed by the multifunction peripheral 100 include printing, facsimile transmission, scanning and sending, and copying.

The printer 101 performs printing based on print information received from the controller 103. The scanner 102 scans an original and transmits image data about the scanned original to the controller 103. The transmitting and receiving unit 105 converts data received via a communication line into print information (via the controller 103) to be output as a print from the printer 101, or transmits image data about an original scanned by the scanner 102 to a destination designated by the controller 103.

Furthermore, in the present exemplary embodiment, the control apparatus 104 is assumed to be provided integrally with an apparatus which executes a task (task execution apparatus), such as the printer 101, the scanner 102, and the transmitting and receiving unit 105, as the multifunction peripheral 100. However, as another example, the control apparatus 104 can be independently provided as an apparatus separate from the task execution apparatus.

Figure 2:
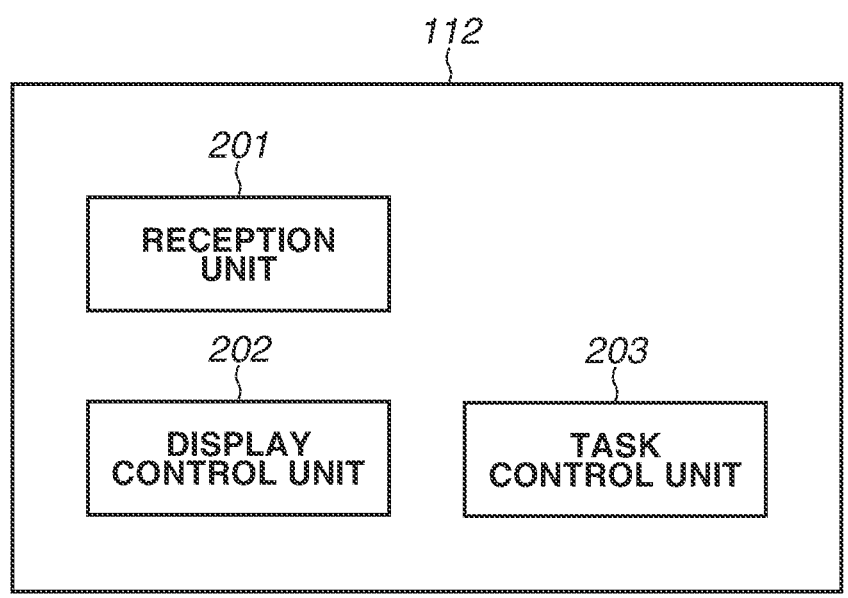
FIG. 2 is a functional configuration diagram of an information processing unit.

FIG. 2 is a functional configuration diagram of the information processing unit 112. The information processing unit 112 includes a reception unit 201, a display control unit 202, and a task control unit 203. The reception unit 201 receives various pieces of information via the touch input unit 122. The display control unit 202 causes the display unit 121 to display a display image corresponding to display image data. The task control unit 203 controls execution of a task performed by the multifunction peripheral 100.

Figure 3:
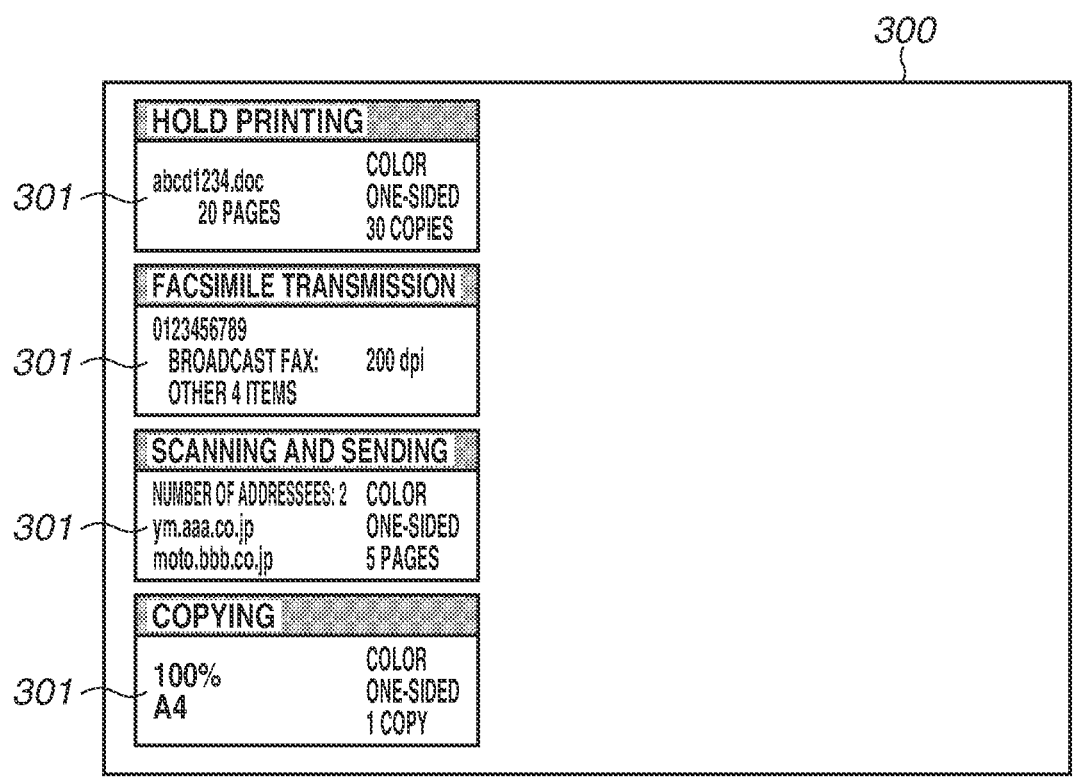
FIG. 3 is a diagram illustrating an example of a screen displayed on a touch display.

FIG. 3 to FIGS. 5A and 5B are diagrams illustrating examples of screens displayed on the touch display 111 of the control apparatus 104. As illustrated in FIG. 3, an operation screen 300 which is used for the user to input an instruction for execution of a task is displayed on the touch display 111. A plurality of buttons respectively corresponding to a plurality of tasks which the multifunction peripheral 100 is able to execute is displayed in the operation screen 300. Four task buttons 301 respectively corresponding to four tasks, i.e., "hold printing", "facsimile transmission", "scanning and sending", and "copying", are displayed in the operation screen 300 illustrated in FIG. 3. Here, each task button 301 is an example of a first graphical user interface (GUI) corresponding to the task. In the present exemplary embodiment, the type of a task and information indicating a part of setting values concerning the task are displayed within a frame of the task button 301. Here, the task button 301 is an example of a button image, and the button image is an example of the first GUI. Moreover, "facsimile transmission" and "scanning and sending" are examples of a task of data transmission.

Figure 4:
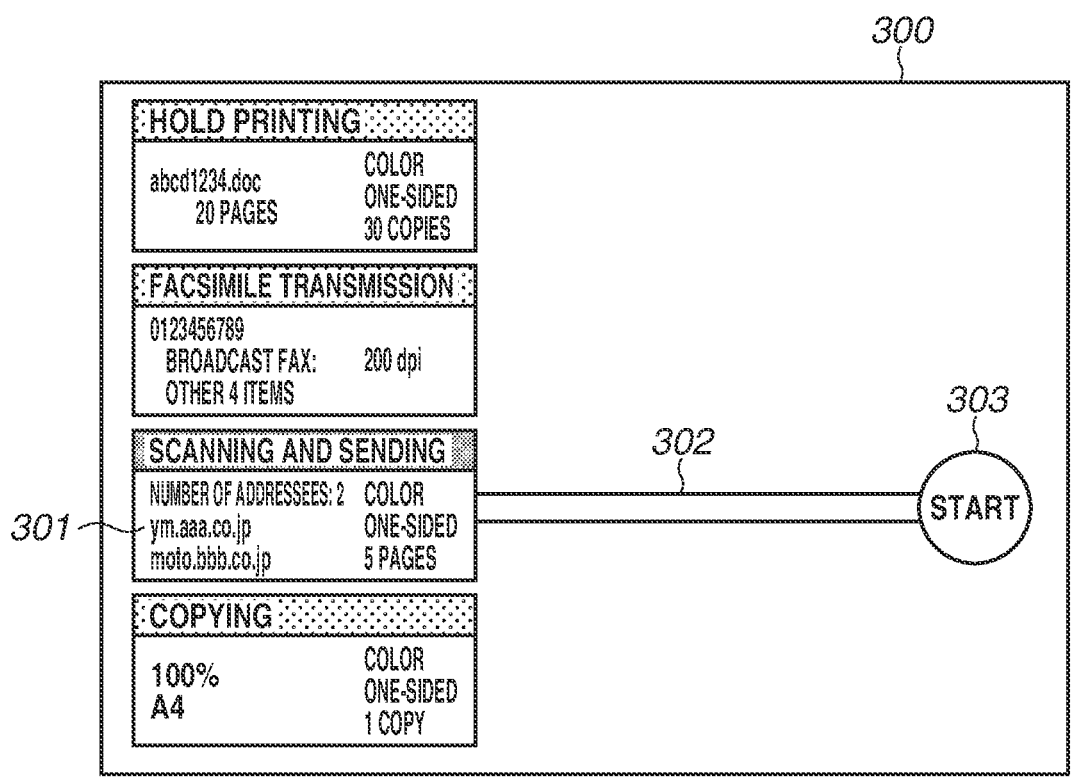
FIG. 4 is a diagram illustrating an example of a screen displayed on the touch display.

FIG. 4 is a diagram illustrating an operation screen 300 displayed in a case where, in the operation screen 300 illustrated in FIG. 3, a touch-down operation (touch operation) has been performed on one task button 301 by the user. When the touch operation is performed, as illustrated in FIG. 4, a slider bar 302 is displayed next to the task button 301 touched by the user and, moreover, a start button 303 is displayed. Furthermore, the start button 303 is displayed at a position adjacent to an end portion of the slider bar 302 at the side opposite to the task button 301. At this time, the CPU 133 sets task buttons 301 other than the task button 301 touched by the user unselectable, i.e., grayed out.

Figure 5A:
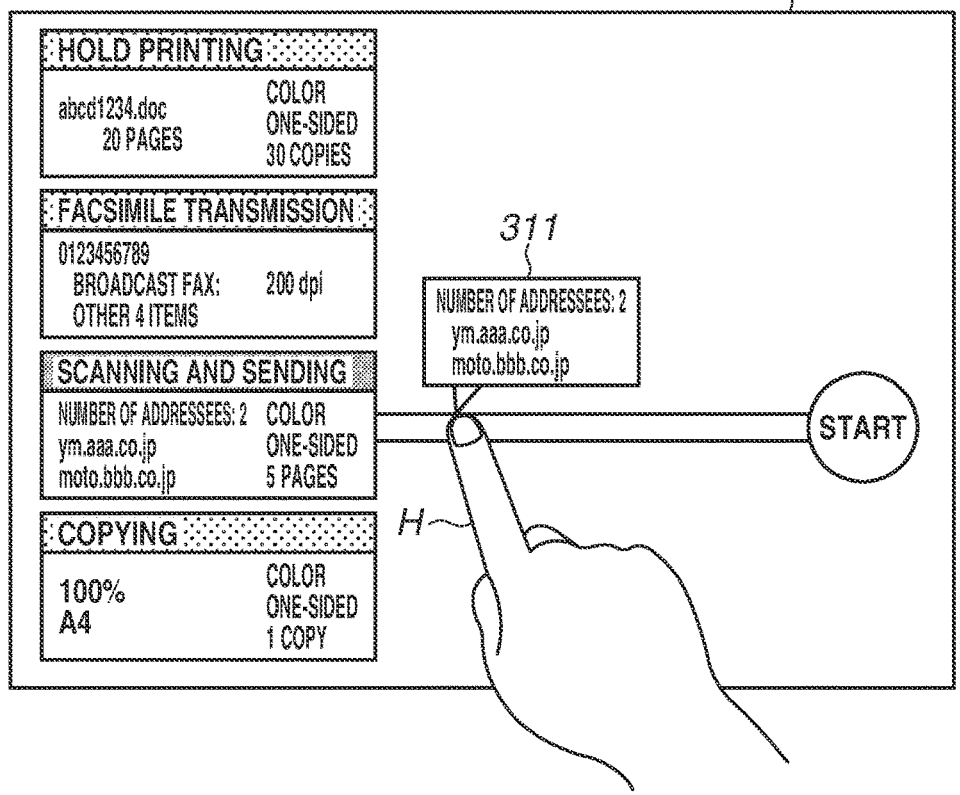
FIGS. 5A and 5B are diagrams illustrating examples of screens displayed on the touch display.
Figure 5B:
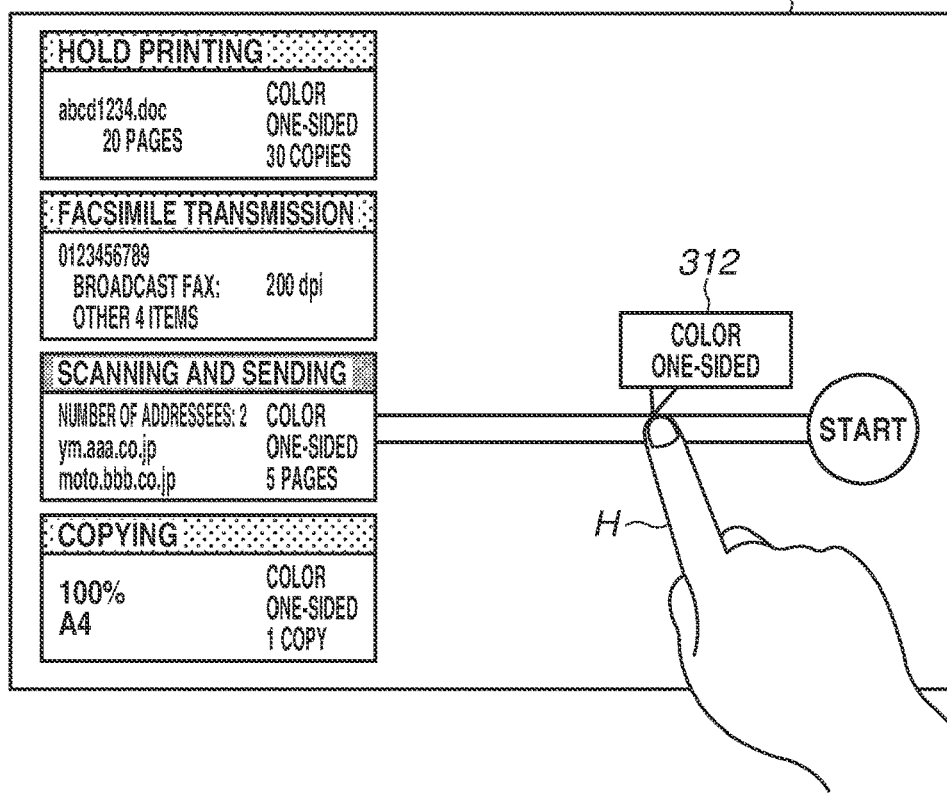

In the operation screen 300 illustrated in FIG. 4, the user performs a move operation (movement operation) of the finger H, serving as an operation element, along the slider bar 302 from the task button 301 toward the start button 303. As illustrated in FIGS. 5A and 5B, a first pop-up screen 311 is displayed according to the movement amount (movement distance) of the move operation, and, then, a second pop-up screen 312 is sequentially displayed. Setting values of the task corresponding to the selected task button 301 are displayed in each of the pop-up screens 311 and 312. Here, the term "pop-up screen" refers to a GUI which is displayed in such a way as to pop up. In the example illustrated in FIGS. 5A and 5B, two types of setting values "number of addressees" and "addressees" with respect to the task of "scanning and sending" are displayed in the first pop-up screen 311. Moreover, two types of setting values "color" and "one-sided" with respect to the task of "scanning and sending" are displayed in the second pop-up screen 312. In this way, different types of setting values are displayed in the respective pop-up screens.

When the move operation is further continued by the user and, then, the position of the finger H arrives at the start button 303, the CPU 133 receives an instruction for execution of the type of task corresponding to the selected task button 301. Then, the CPU 133 performs control to execute the task. Specifically, the CPU 133 issues an execution command to execute the task to the controller 103. With this, in the example illustrated in FIGS. 5A and 5B, the task of "scanning and sending" is executed.

In the present exemplary embodiment, the CPU 133 performs control to display the first pop-up screen 311 in a case where the movement amount in the move operation from the position at which the touch-down operation has been performed has reached a first movement amount. The CPU 133 further performs control to display the second pop-up screen 312 in a case where the movement amount has reached a second movement amount. Here, the first movement amount and the second movement amount are predetermined movement amounts, and the second movement amount is assumed to be larger in value than the first movement amount.

Moreover, in the present exemplary embodiment, the CPU 133 displays, in the operation screen 300, task buttons 301 as GUIs each for receiving an instruction for execution of a task. This enables the user to intuitively understand that it is possible to select a task button 301 by performing a touch-down operation on the task button 301. Furthermore, since a GUI which is displayed when the task button 301 has been selected is the slider bar 302, the user can intuitively understand the necessity of performing a move operation along the slider bar 302. In this way, in the control apparatus 104 according to the present exemplary embodiment, even when not understanding the operation procedure, the user can intuitively operate a GUI to perform appropriate inputting of an instruction. Furthermore, the move operation is an operation that is continuously performed, and is an example of a continuing operation. Moreover, the slider bar 302 is an example of an image indicating a path of the continuing operation, and an image indicating the path is an example of a second GUI.

Figure 6:
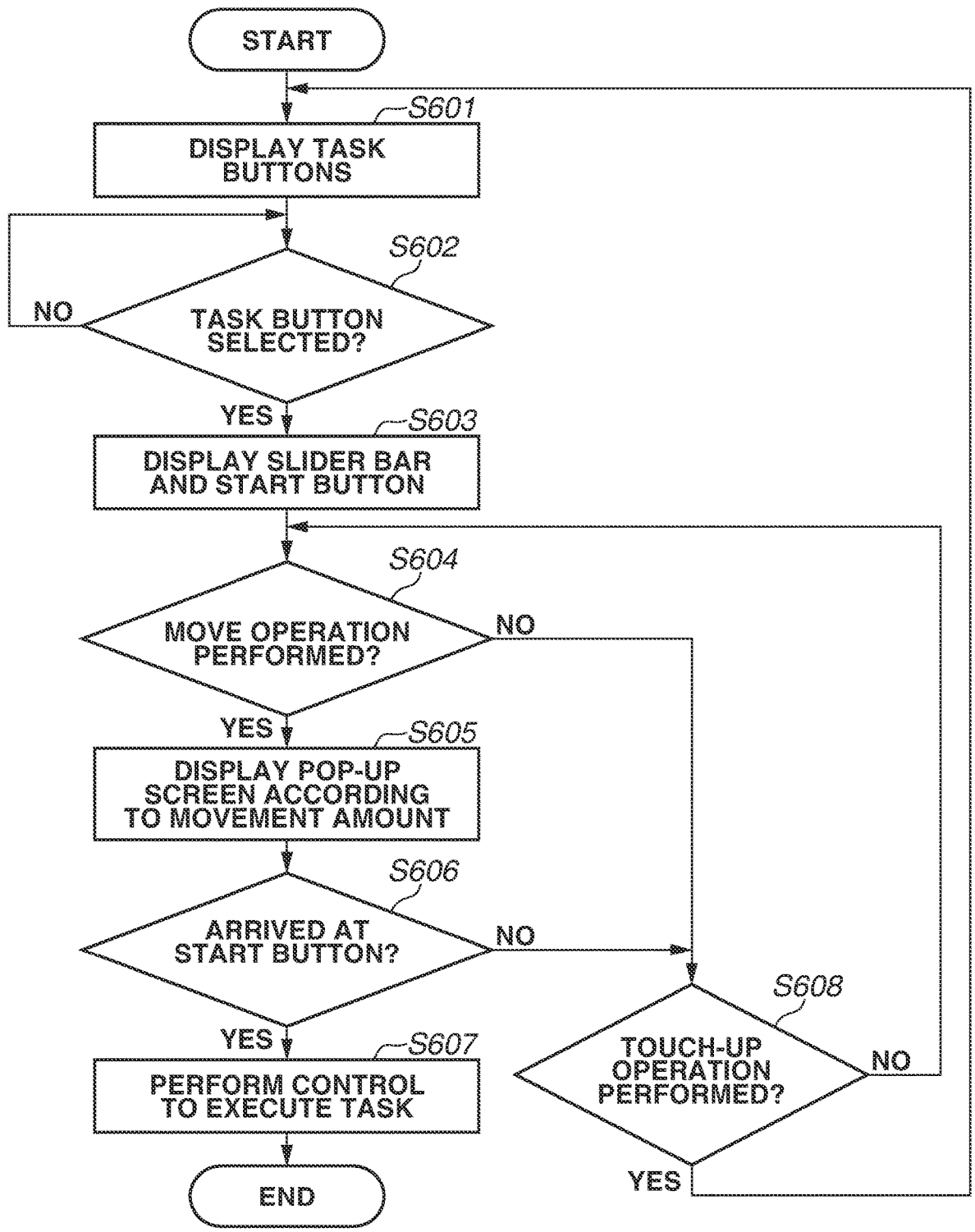
FIG. 6 is a flowchart illustrating control processing.

FIG. 6 is a flowchart illustrating control processing which is performed by the control apparatus 104. In step S601, the display control unit 202 performs control to display a plurality of task buttons 301 on the touch display 111. Next, in step S602, the reception unit 201 checks whether a task button 301 has been selected by the user. In a case where a touch-down operation has been performed on a task button 301, the reception unit 201 determines that a task button 301 has been selected. The reception unit 201 waits until a task button 301 is selected, and, if it is determined that a task button 301 has been selected (YES in step S602), the reception unit 201 advances the processing to step S603. In step S603, the display control unit 202 performs control to display a slider bar and a start button at positions corresponding to the selected task button 301. Furthermore, the reason why, in this way, a slider bar and a start button corresponding to each task button are not displayed at the time of processing in step S601 is that a display area may be occupied by displaying of them and the number of task buttons able to be displayed may be restricted.

After processing in step S603, then in step S604, the reception unit 201 checks whether a move operation has been performed along the slider bar following the touch-down operation. If it is determined that the movement operation has been performed (YES in step S604), the reception unit 201 advances the processing to step S605. If it is determined that the movement operation has not been performed (NO in step S604), the reception unit 201 advances the processing to step S608. In step S605, the display control unit 202 performs control to display a pop-up screen according to the movement amount of the move operation. Here, the pop-up screen is a screen indicating setting values set to the selected task, as mentioned with reference to FIGS. 5A and 5B. For example, the display control unit 202 performs control to display the first pop-up screen 311 when the movement amount has reached a first movement amount and to display the second pop-up screen 312 when the movement amount has reached a second movement amount. Here, the first movement amount and the second movement amount are predetermined movement amounts, and the second movement amount is assumed to be larger in value than the first movement amount.

Next, in step S606, the reception unit 201 checks whether the operation position of the move operation has arrived at the start button 303. If it is determined that the operation position has arrived at the start button 303 (YES in step S606), the reception unit 201 determines that an instruction for execution of a task has been received and then advances the processing to step S607. If it is determined that the operation position has not arrived at the start button 303 (NO in step S606), the reception unit 201 advances the processing to step S608. In step S607, the task control unit 203 performs control to execute a task corresponding to the selected task button 301. Specifically, the task control unit 203 issues an execution command for executing the task to the controller 103. Then, the control processing ends.

On the other hand, in step S608, the reception unit 201 checks whether a touch-up operation has been performed. If it is determined that the touch-up operation has been performed (YES in step S608), the reception unit 201 returns the processing to step S601. With this, when the touch-up operation has been performed, the task control unit 203 performs control not to execute a task. Furthermore, in a case where, when it is determined that the touch-up operation has been performed, a slider bar, a start button, and a pop-up screen have already been displayed, the reception unit 201 causes the display control unit 202 to stop displaying of them and then returns the processing to step S601. Moreover, if it is determined that the touch-up operation has not been performed (NO in step S608), the reception unit 201 returns the processing to step S604.

As described above, the control apparatus 104 according to the present exemplary embodiment receives an instruction for execution of a task on the condition that a move operation has been performed following a touch-down operation. This enables preventing an instruction for execution of a task from being input due to an unintended touch. Moreover, during a period until a move operation is completed, the control apparatus 104 sequentially displays a plurality of setting values of a task according to the movement amount in the move operation. Furthermore, in a case where a touch-up operation has been performed before the move operation is completed, the control apparatus 104 performs control not to execute a task. Accordingly, prior to the move operation being completed, the user can check whether no task is executed with unintended settings. Furthermore, in a case where the setting values are not intended values, the user can perform a touch-up operation to stop inputting of an instruction for execution.

In this way, the multifunction peripheral 100 according to the present exemplary embodiment can execute a task intended by the user while, with an efficient and simple operation, preventing the task from being executed in response to a touch unintended by the user.

Furthermore, as a first modification example of the first exemplary embodiment, a touch display and an apparatus for executing a task can be respective different apparatuses. For example, a first apparatus is assumed to include a touch display and to receive an instruction for execution of a task which is executable by a second apparatus. In this case, task buttons respectively corresponding to a plurality of tasks executable by the second apparatus are displayed on the touch display. Then, in a case where a task has been selected in response to a user operation performed on the touch display, the first apparatus only needs to transmit an execution command for the selected task to the second apparatus.

As a second modification example, the number of pop-up screens which the control apparatus 104 displays is not limited to that in the present exemplary embodiment, and the control apparatus 104 can display three or more pop-up screens.

As a third modification example, the control apparatus 104 can control displaying of pop-up screens according to the duration time of a move operation instead of the movement amount of a move operation. For example, in a case where the duration time of a move operation has reached a first time, the control apparatus 104 performs control to display the first pop-up screen 311. Then, in a case where the duration time has reached a second time, the control apparatus 104 performs control to display the second pop-up screen 312. Here, the first time and the second time are predetermined times, and the second time is assumed to be larger in value than the first time. Here, the move operation is an example of a continuing operation, and each of the movement amount and the duration time in the move operation is an example of a continuation amount of the continuing operation.

Moreover, the control apparatus 104 can be configured to also control execution of a task according to the duration time of a move operation instead of the movement amount in a move operation. In the present exemplary embodiment, the control apparatus 104 determines that a move operation serving as a continuing operation has completed, based on the finger H being moved from a task button to a start button and thus performs control to execute a task. In other words, the control apparatus 104 controls execution of a task according to the movement amount. Instead of this, for example, in a case where the duration time of a move operation from a task button has exceeded a given time, the control apparatus 104 can determine that the move operation has completed and thus perform control to execute a task. In this case, the control apparatus 104 can perform control to display only a slider bar serving as a guide for the move operation and not to display a start button serving as an arrival point of the move operation.

Figure 7A:
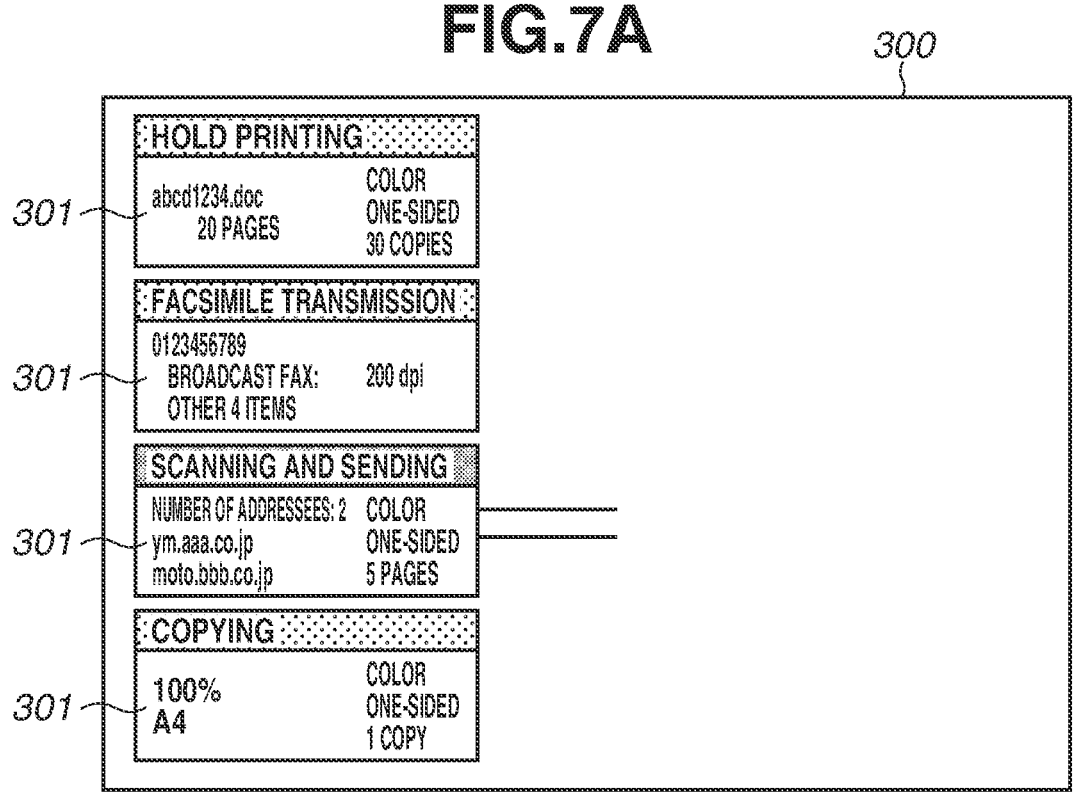
FIGS. 7A, 7B, 7C, and 7D are explanatory diagrams of modification examples.
Figure 7B:
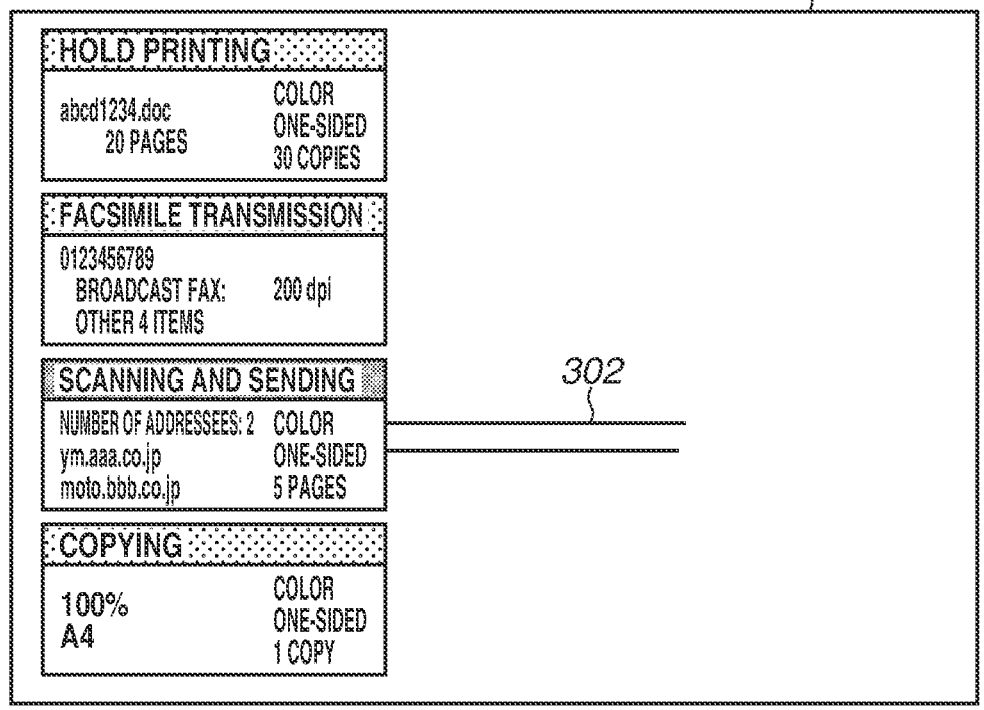
Figure 7C:
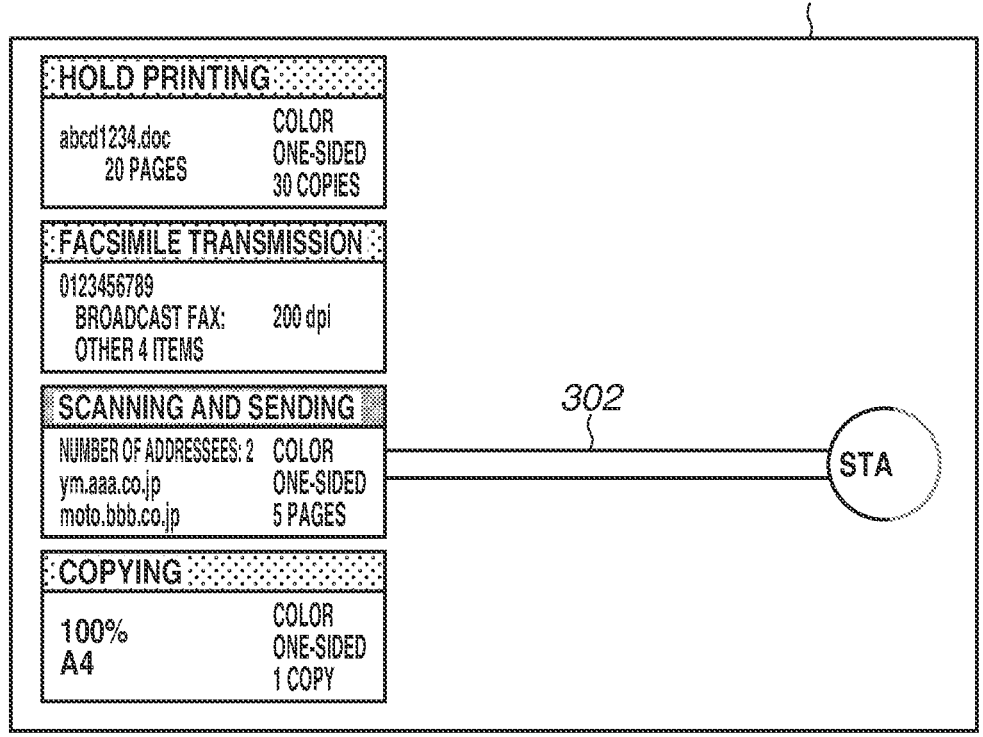
Figure 7D:
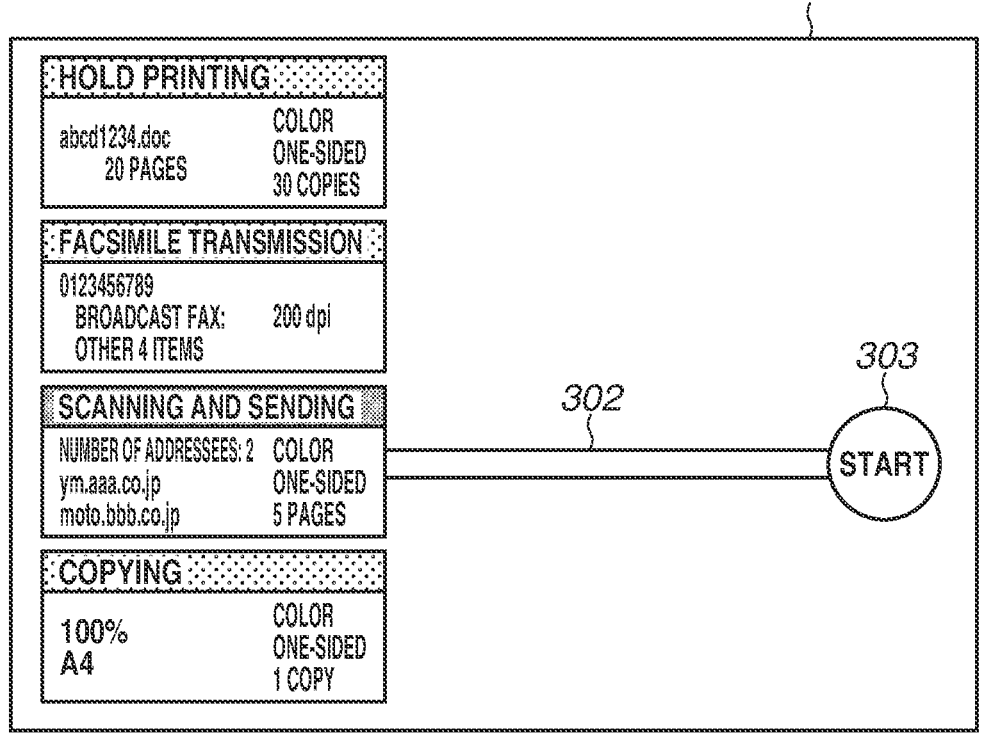

As a fourth modification example, as illustrated in FIGS. 7A, 7B, 7C, and 7D, when a task button has been selected, the control apparatus 104 can perform control to gradually display a slider bar from a start position toward an end position according to the movement of position of the finger H in the move operation. When a task button 301 is selected by the user, as illustrated in FIG. 7A, a slider bar 302 begins to extend from the selected task button 301 toward a position in which a start button 303 is to be displayed. Furthermore, in this instance, the start button 303 is not yet displayed. Moreover, the slider bar 302 further extends as illustrated in FIG. 7B, the start button 303 gradually appears as illustrated in FIG. 7C, and, finally, up to the right end of the start button 303 is displayed as illustrated in FIG. 7D. Furthermore, a period of time from the start of displaying of the slider bar 302 to displaying of up to the right end of the start button 303 is assumed to be a short time such as one second. Furthermore, the control apparatus 104 can perform displaying from the start of displaying of the slider bar 302 to displaying of the start button 303 by switching a plurality of still images, or, as another example, by continuously using a moving image.

With displaying performed in this way, the user easily becomes aware that a slider bar 302 has newly been displayed. Moreover, a change of displaying of the slider bar 302 enables displaying how to perform an operation in the move operation in a more easily understandable way. For example, in the example illustrated in FIGS. 7A to 7D, since the slider bar 302 becomes extended from the task button 301 toward the start button 303, the user can easily understand that the user only needs to perform the move operation along the direction in which the slider bar 302 becomes extended.

As a fifth modification example, the control apparatus 104 only needs to display a slider bar and a start button in association with at least one of a plurality of task buttons displayed in an operation screen. Then, with regard to the other task buttons, the control apparatus 104 can start performing control to execute a task on the condition that a touch-down operation has been performed. For example, with regard to a task which needs careful determination, the control apparatus 104 can perform control to display, for example, a slider bar, and, with regard to a task which does not careful determination, the control apparatus 104 can perform control not to display, for example, a slider bar.

Figure 8A:
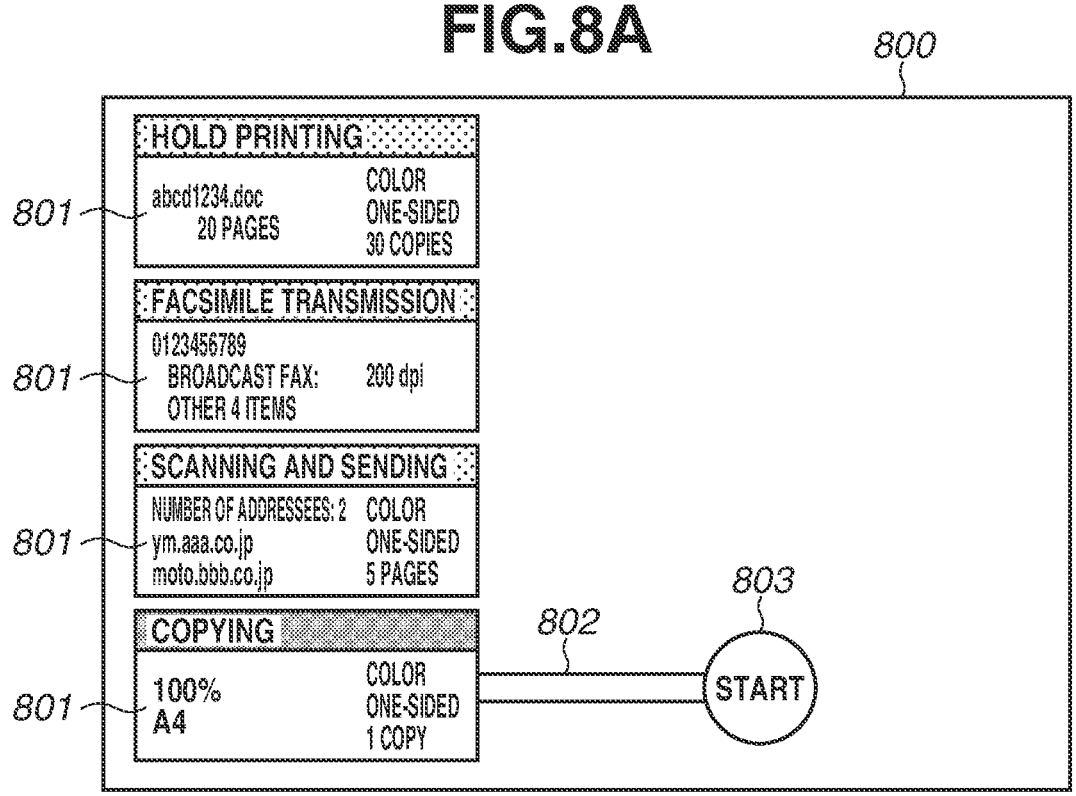
FIGS. 8A and 8B are diagrams illustrating operation screens.
Figure 8B:
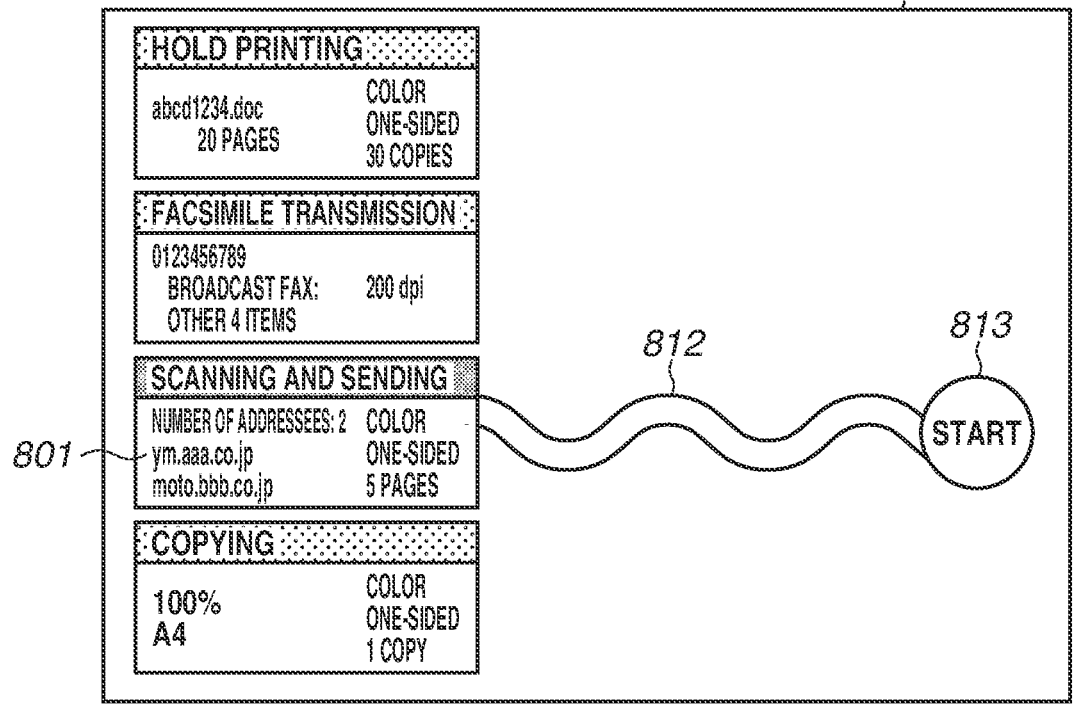

Next, with regard to a multifunction peripheral 100 according to a second exemplary embodiment, differences thereof from the multifunction peripheral 100 according to the first exemplary embodiment are described. Each of FIGS. 8A and 8B is a diagram illustrating an operation screen 800 which is displayed on the touch display 111 according to the second exemplary embodiment. As with the operation screen 300, a plurality of task buttons 801 is displayed in the operation screen 800. For example, as illustrated in FIG. 8A, a task button 801 of "copying" is assumed to have been selected. In this case, similar to that described in the first exemplary embodiment, the control apparatus 104 displays a linear slider bar 802, which becomes extended in the horizontal direction in the screen, and also displays a start button 803 at the end of the slider bar 802. On the other hand, as illustrated in FIG. 8B, a task button 801 of "scanning and sending" is assumed to have been selected. In this case, the control apparatus 104 displays a wavy slider bar 812 and also displays a start button 813 at the end of the slider bar 812. Here, the slider bar 802 and the slider bar 812 differ in shape and length.

Figure 9A:
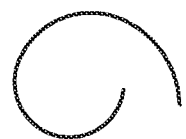
FIGS. 9A, 9B, and 9C are diagrams illustrating examples of a slider bar.
Figure 9B:
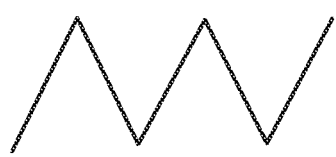
Figure 9C:
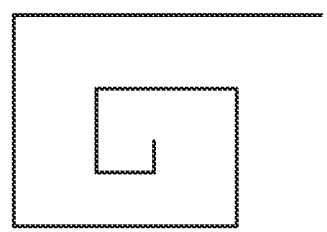

In this way, the control apparatus 104 according to the second exemplary embodiment displays one of slider bars different in shape and length according to the type of a task. Furthermore, as another example, the control apparatus 104 only needs to display one of slider bars different in at least one of shape and length according to the type of a task, and the shape and length of a slider bar are not limited to those in the present exemplary embodiment. FIGS. 9A, 9B, and 9C are diagrams illustrating examples of slider bars different in shape, length, and direction of operation.

Furthermore, the task "scanning and sending" needs more careful control of execution of a task than the task "copying". To address this issue, in the present exemplary embodiment, the wavy slider bar 812, which requires a careful operation, is associated with the task "scanning and sending", which requires careful determination in executing a task. This enables appropriately associating a user operation and the content of a task with each other.

Here, examples of the content of a task include, besides the types of tasks such as "copying" and "printing", the large or small magnitude of numerical quantity such as the number of copies for printing in the same task, the large or small length of time required for execution of a task, the large or small number of setting items, and the large or small magnitude of arising cost. Moreover, further examples of the content of a task include the distinction between the inside and outside of the company or between the inside and outside of the country with respect to an addressee and the high or low importance previously determined according to the type of a function. Moreover, examples of a user operation corresponding to the content of a task include, with regard to copying, performing a user operation corresponding to a slider bar having a length corresponding to the number of copies. Moreover, as another example, examples of such a user operation include performing a user operation corresponding to a slider bar the length of which is larger or the shape of which is more complicated in a case where the addressee of "facsimile transmission" is the outside of the company than in in a case where the addressee of "facsimile transmission" is the inside of the company. Furthermore, the configurations and processing operations other than those described above of the multifunction peripheral 100 according to the second exemplary embodiment are similar to the corresponding configurations and processing operations of the multifunction peripheral 100 according to the first exemplary embodiment.

Figure 10A:
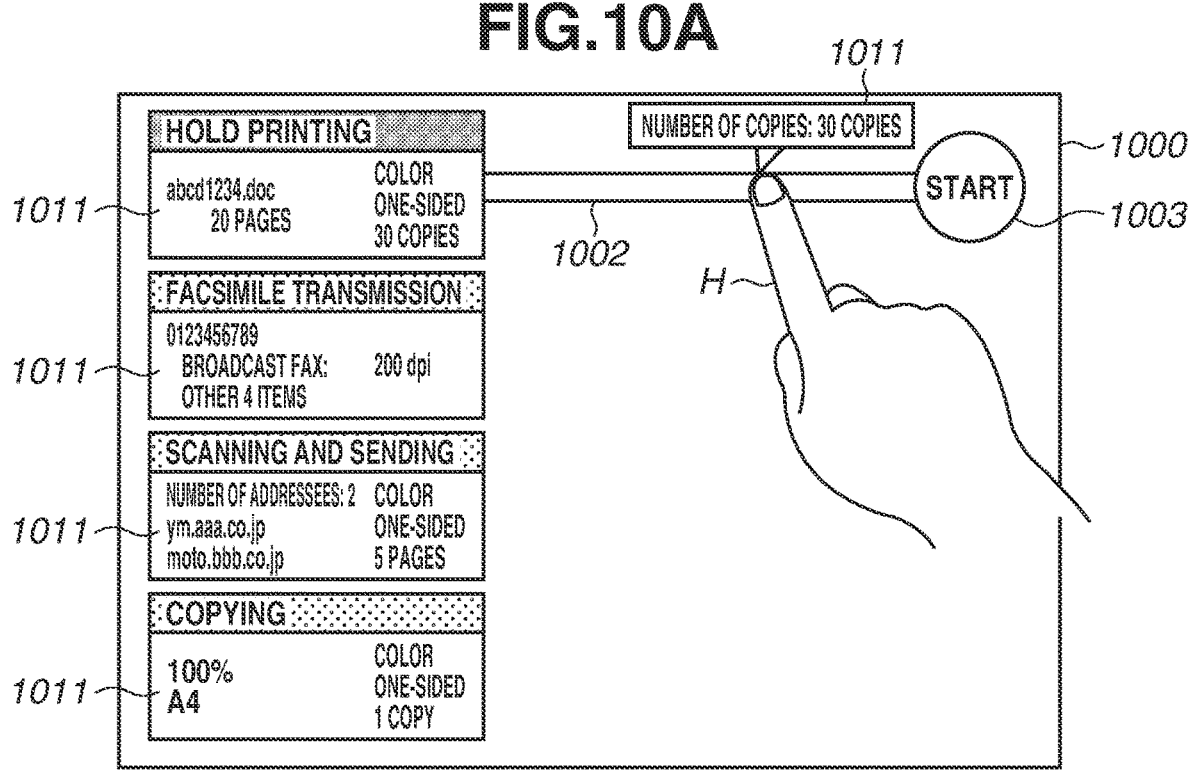
FIGS. 10A, 10B, and 10C are diagrams illustrating a screen transition of operation screens.
Figure 10B:
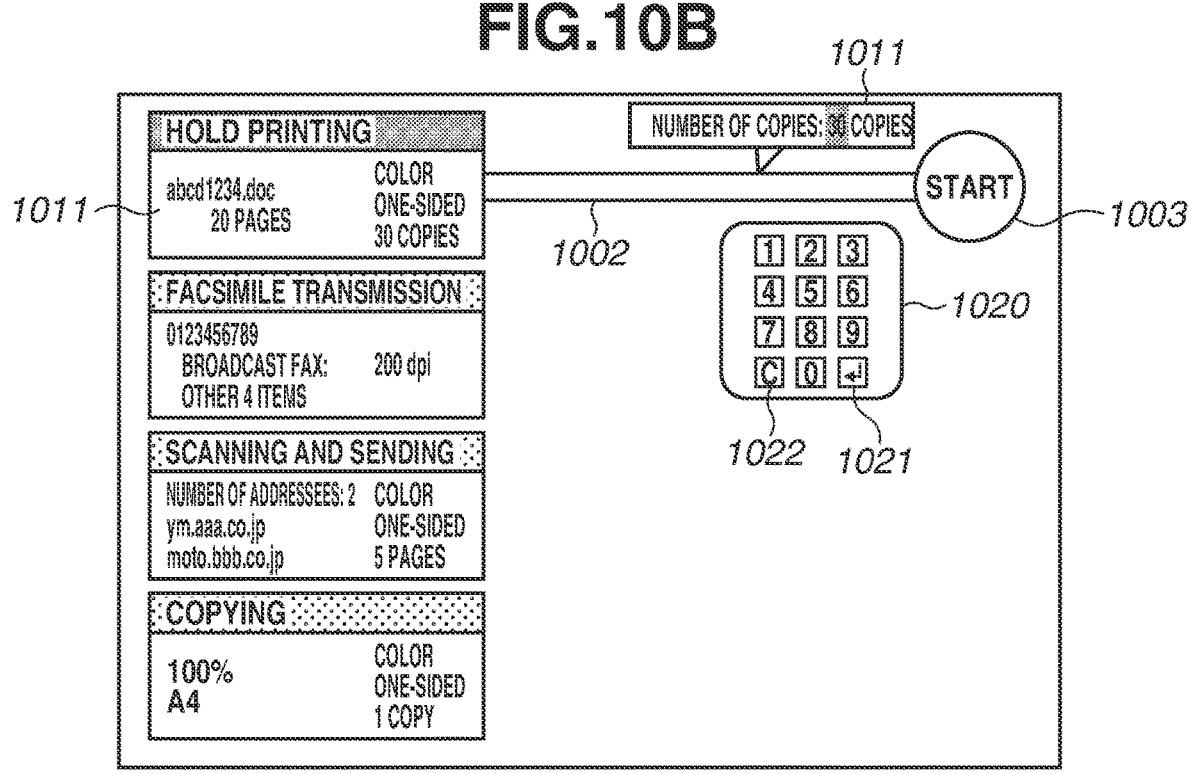
Figure 10C:
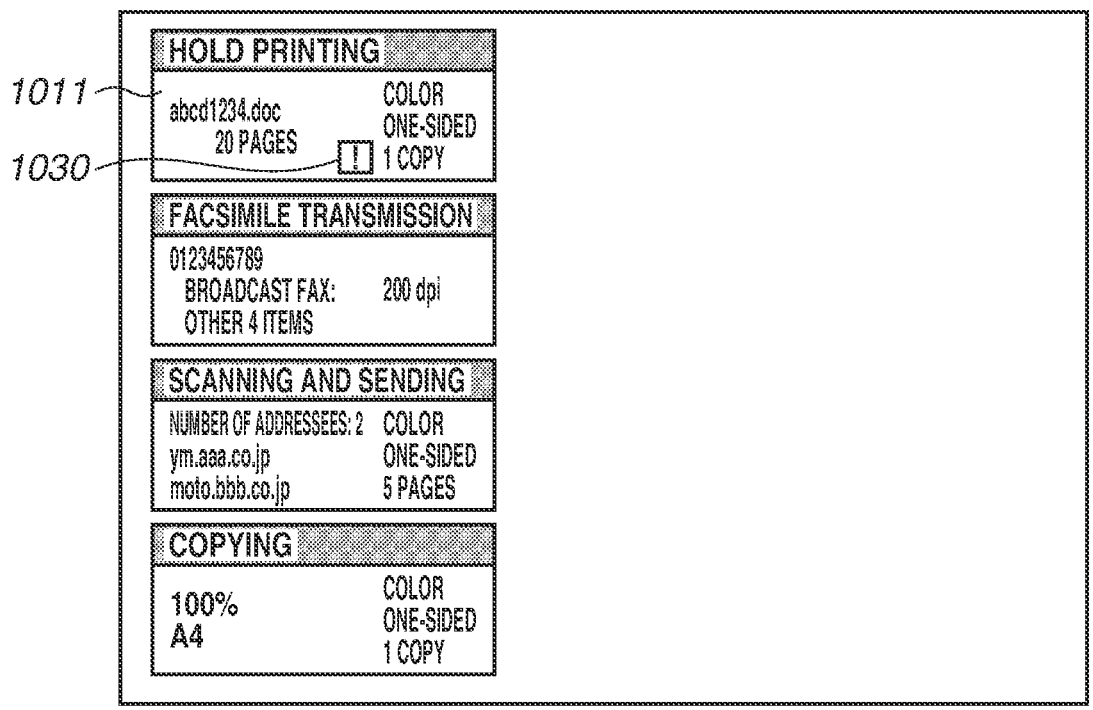

Next, with regard to a multifunction peripheral 100 according to a third exemplary embodiment, differences thereof from the multifunction peripherals 100 according to the other exemplary embodiments are described. In the third exemplary embodiment, the user can select a task button and then change setting values, which the user has confirmed during a move operation. FIGS. 10A, 10B, and 10C are diagrams illustrating a screen transition of an operation screen 1000 according to the third exemplary embodiment. As illustrated in FIG. 10A, four task buttons 1001 are displayed in the operation screen 1000, as in the operation screens described in the other exemplary embodiments. Moreover, in the example illustrated in FIG. 10A, a slider bar 1002 and a start button 1003 are also displayed in association with a touch-down operation being performed on the task button 1001 of "hold printing". In the example illustrated in FIG. 10A, a pop-up screen 1011 is also displayed according to a move operation performed following the touch-down operation.

Here, when wanting to change the setting value "number of copies: 30 copies" displayed in the pop-up screen 1011 to "1 copy", the user performs a touch-up operation with the pop-up screen 1011 kept displayed. With this, as illustrated in FIG. 10B, an input screen 1020 is displayed in the operation screen 1000, and the slider bar 1002 and the start button 1003 are grayed out. A software numeric keypad is displayed in the input screen 1020.

When the user inputs the intended number of copies into the input screen 1020 and then presses an enter key 1021, as illustrated in FIG. 10C, the input screen 1020 disappears from the operation screen 1000 and a change of the setting value is reflected in displaying of the task button 1001. In the example illustrated in FIG. 10C, the number of copies in the task button 1001 of "hold printing" is changed from "30 copies" illustrated in FIG. 10A to "1 copy". Moreover, an icon 1030 indicating a changed item is displayed in association with the changed setting value "1 copy". This enables the user to readily confirm the changed setting value.

When wanting to execute a task with this setting value, the user re-selects the task button 1001 in which the setting value has been changed as illustrated in FIG. 10C and then performs a move operation. With this, the changed setting value is displayed again in a pop-up manner. Then, when the move operation arrives at the start button 1003, the user can issue an instruction to execute a task with the changed setting value.

Furthermore, a cancel key 1022 is assumed to be pressed with the input screen 1020 kept displayed as illustrated in FIG. 10B. In this case, the input screen 1020 disappears and the slider bar 1002, the start button 1003, and the pop-up screen 1011 also disappear, so that the operation screen 1000 restores to its state obtained before the touch-down operation is performed.

Figure 11:
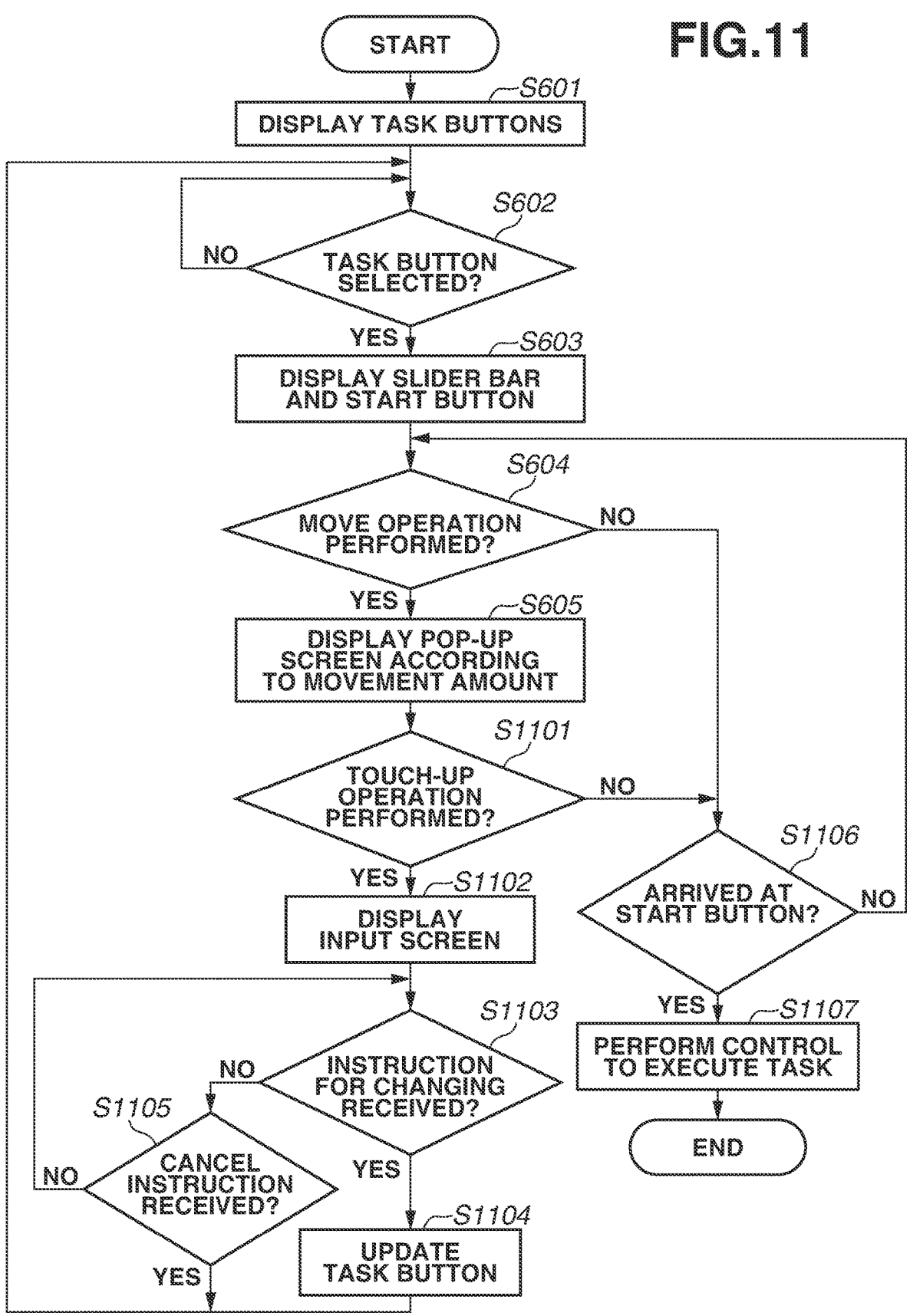
FIG. 11 is a flowchart illustrating control processing.

FIG. 11 is a flowchart illustrating control processing which is performed by the control apparatus 104 according to the third exemplary embodiment. Furthermore, among processing operations in the control processing illustrated in FIG. 11, the same processing operations as the processing operations in the control processing according to the first exemplary embodiment described with reference to FIG. 6 are assigned the respective same reference numerals. If, in step S604, it is determined that the move operation has been performed (YES in step S604), the reception unit 201 advances the processing to step S605, and, on the other hand, if it is determined that the move operation has not been performed (NO in step S604), the reception unit 201 advances the processing to step S1106. In step S1101, the reception unit 201 checks whether a touch-up operation has been performed. If it is determined that the touch-up operation has been performed (YES in step S1101), the reception unit 201 advances the processing to step S1102. If it is determined that the touch-up operation has not been performed (NO in step S1101), the reception unit 201 advances the processing to step S1106.

In step S1102, the display control unit 202 performs control to display an input screen for setting values. Moreover, at this time, the display control unit 202 causes the slider bar and the start button to be grayed out. Here, the input screen is an example of a screen for receiving an instruction for changing setting values. Next, in step S1103, the reception unit 201 checks whether an instruction for changing setting values has been received in response to a user operation. When a setting value is input and the enter key 1021 is pressed by the user, the reception unit 201 receives an instruction for changing into the input setting value. If it is determined that the instruction for changing has been received (YES in step S1103), the reception unit 201 advances the processing to step S1104. If it is determined that no instruction for changing has been received (NO in step S1103), the reception unit 201 advances the processing to step S1105.

In step S1104, the display control unit 202 updates displaying of the task button 1001. Specifically, the display control unit 202 displays the changed setting value in the task button 1001 corresponding to the instruction for changing and also displays an icon in association with the changed setting value. Moreover, the display control unit 202 ends displaying of the input screen and the slider bar 1002 and the start button 1003 which are being grayed out. Moreover, the task control unit 203 performs control to change the setting values by transmitting the changed setting value to the controller 103. Then, the CPU 133 returns the processing to step S602. Thus, processing operations in step S602 and subsequent steps enable executing a task with the changed setting value.

Moreover, in step S1105, the reception unit 201 checks whether a cancel instruction for setting input has been received. In a case where the cancel key is pressed in the input screen, the reception unit 201 receives the cancel instruction. If it is determined that the cancel instruction has not been received (NO in step S1105), the reception unit 201 returns the processing to step S1103. If it is determined that the cancel instruction has been received (YES in step S1105), the reception unit 201 causes the display control unit 202 to end displaying of the input screen and the slider bar 1002 and the start button 1003 which are being grayed out, and then returns the processing to step S602. With this, at the time of processing in step S602, only the task buttons 1001 are displayed in the operation screen 1000. Thus, the operation screen 1000 restores to its state obtained before the touch-down operation is performed.

Moreover, in step S1106, the reception unit 201 checks whether the operation position of the move operation has arrived at the start button 303. If it is determined that the operation position has arrived at the start button 303 (YES in step S1106), the reception unit 201 advances the processing to step S1107. If it is determined that the operation position has not arrived at the start button 303 (NO in step S1106), the reception unit 201 returns the processing to step S604. In step S1107, the task control unit 203 performs control to execute a task corresponding to the selected task button. Specifically, the task control unit 203 issues an execution command to execute the task to the controller 103. Then, the control processing ends. Furthermore, the configurations and processing operations other than those described above of the multifunction peripheral 100 according to the third exemplary embodiment are similar to the corresponding configurations and processing operations of the multifunction peripherals 100 according to the other exemplary embodiments.

In this way, in the multifunction peripheral 100 according to the present exemplary embodiment, when issuing an instruction for execution of a task, the user not only can confirm the settings of the task but also can change the setting values and also stop execution of the task.

Figure 12:
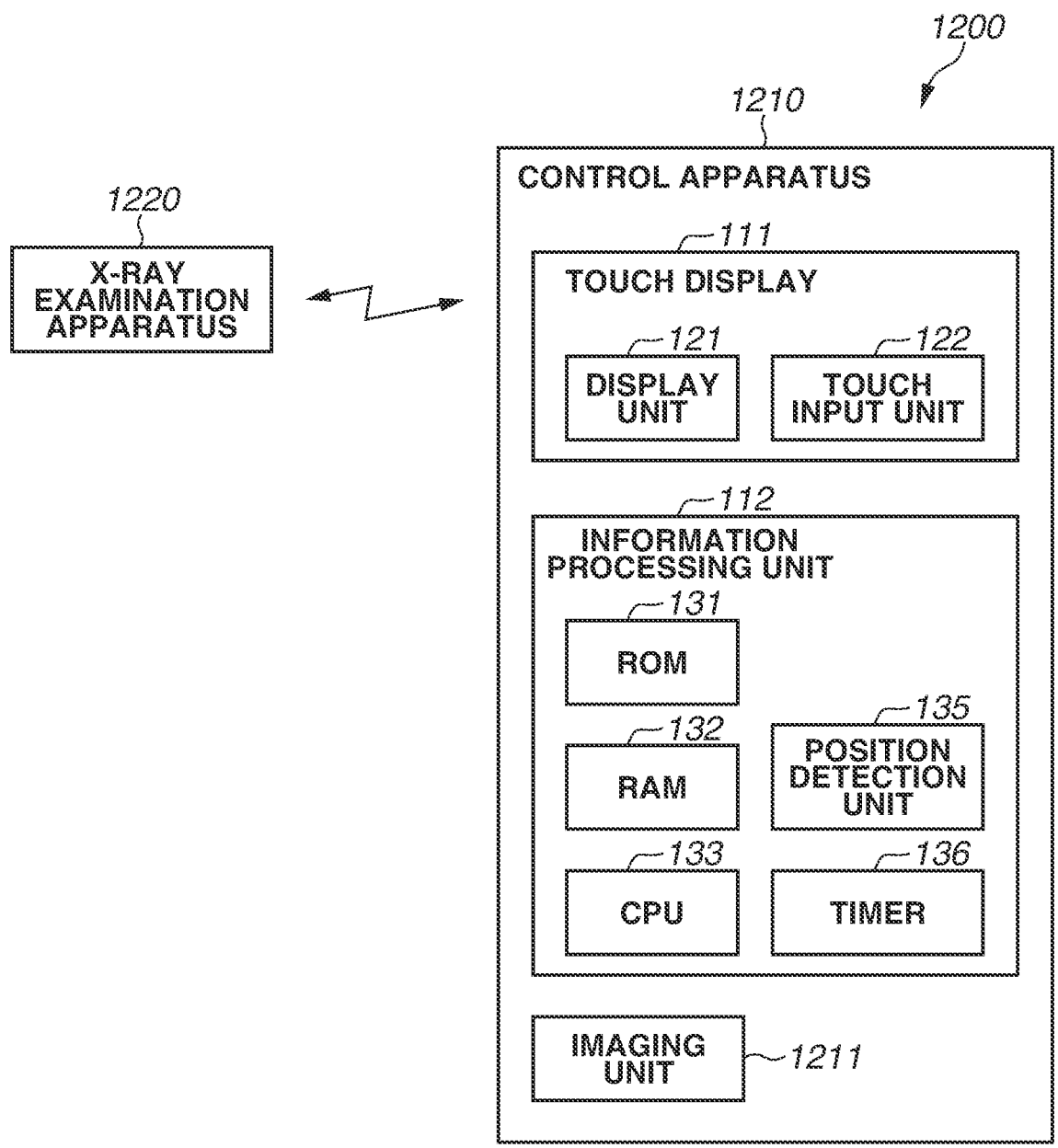
FIG. 12 is an overall view of an X-ray control system according to a fourth exemplary embodiment.

FIG. 12 is an overall view of an X-ray control system 1200 according to a fourth exemplary embodiment. The X-ray control system 1200 includes a control apparatus 1210 and an X-ray examination apparatus 1220. The control apparatus 1210 and the X-ray examination apparatus 1220 are able to communicate with each other via a network. The control apparatus 1210 includes a touch display 111 and an information processing unit 112, as with the control apparatus 104 according to the first exemplary embodiment, and further includes an imaging unit 1211. The imaging unit 1211 captures an image. The control apparatus 1210 according to the fourth exemplary embodiment controls execution of a task in the X-ray examination apparatus 1220.

The control apparatus 1210 prevents a task from being executed in response to an unintended touch performed by the user and allows the user to issue an instruction for execution of a task while sequentially confirming the content of the task, and is, therefore, particularly suitable for a task considered of consequence. Here, examples of the task considered of consequence include the following three tasks:
(1) a task a cancellation of which after being executed is difficult or impossible;
(2) a task the effect of which caused by being executed extends to another person; and
(3) a task in which the contents (setting values) constituting the task are wide-ranging.

An example of the task considered of consequence applicable to the above-mentioned tasks is transmission in the multifunction peripheral 100, described in, for example, the first exemplary embodiment. Generally, a cancellation after execution of transmission is difficult, information is known to another person (receiver), and there are wide-ranging settings, such as an addressee, the number of pages to be sent, the distinction between one-sided and two-sided documents, and the data resolution.

Moreover, the task considered of consequence further includes exposure to radiation performed by the X-ray examination apparatus 1220. The exposure to radiation inevitably causes a subject to be exposed to radiation. Moreover, exposure to X-rays requires wide-ranging settings, such as exposed doses, X-ray component spectra, exposure ranges, and exposure times, according to, for example, examination regions, examination (imaging) directions, and physical builds or constitutions of subjects.

Figure 13:
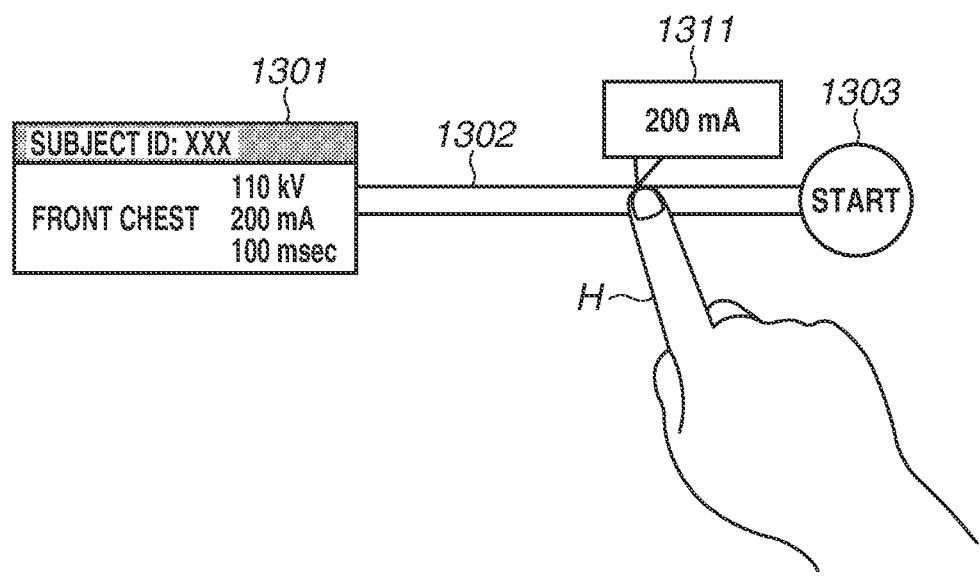
FIG. 13 is a diagram illustrating an example of a screen displayed on a touch display according to the fourth exemplary embodiment.

FIG. 13 is a diagram illustrating an example of a screen displayed on the touch display 111 of the control apparatus 1210 according to the fourth exemplary embodiment. A task button 1301 is displayed on the touch display 111, and a slider bar 1302 and a start button 1303 are also displayed thereon according to a touch-down operation. Moreover, a pop-up screen 1311 is also displayed according to a move operation. Furthermore, when the move operation continues and then arrives at the start button 1303, the control apparatus 1210 issues an execution command to execute a task including X-ray exposure.

Moreover, the control apparatus 1210 according to the present exemplary embodiment performs control to allow execution of a task only in a case where the X-ray examination apparatus 1220, which is an execution apparatus for a task targeted for control by the control apparatus 1210, is present within a range able to be viewed by the user of the control apparatus 1210. Specifically, the control apparatus 1210 is assumed to allow an issuance of an execution command for a task in a case where an image of the X-ray examination apparatus 1220 has been captured by the imaging unit 1211. Then, in a case where the issuance of an execution command has been allowed, when an instruction for execution of a task has been received according to a user operation in the control processing described with reference to, for example, FIG. 6, the control apparatus 1210 issues an execution command, thus performing control to execute a task.

Furthermore, before starting control processing, the control apparatus 1210 can output a message for prompting the user to direct the imaging unit 1211 toward the X-ray examination apparatus 1220. Furthermore, the control apparatus 1210 is assumed to previously store the image of the X-ray examination apparatus 1220 and to perform image matching between the stored image and a captured image so as to determine whether the captured image is the image of the X-ray examination apparatus 1220. Furthermore, the configurations and processing operations other than those described above of the control apparatus 1210 according to the fourth exemplary embodiment are similar to the corresponding configurations and processing operations of the multifunction peripherals 100 according to the other exemplary embodiments.

An instruction for an exposure operation of the X-ray examination apparatus 1220 can be issued from the portable control apparatus 1210, which is provided as an apparatus separate from the X-ray examination apparatus 1220, so that an examining technician (operator) is enabled to perform an exposure manipulation while assisting a subject. Therefore, for example, the realization of an examination environment about which a subject can feel safe or the improvement in examination efficiency can be expected. On the other hand, since an instruction for execution of a task can be issued from a separated place or a separate room, this may cause, for example, a confirmation error. Therefore, in the present exemplary embodiment, in the above-described way, only in a situation in which the user (examining technician) of the control apparatus 1210 is able to view the X-ray examination apparatus 1220, an instruction for execution of a task is allowed to be issued from the control apparatus 1210. In this way, since, only in a case where an execution apparatus for a task is present within a range viewable by the user, an instruction for execution of a task is allowed to be issued from the control apparatus 1210, the control apparatus 1210 according to the fourth exemplary embodiment is able to perform execution of a task more safely.

As a first modification example of the fourth exemplary embodiment, an execution apparatus for a task serving as a target for such control that execution of a task is allowed only in a case where the execution apparatus is present within a range viewable by the user of the control apparatus 1210 is not limited to an X-ray examination apparatus. As another example, the execution apparatus can be, for example, a multifunction peripheral which is an apparatus provided separately from a control apparatus.

As a second example, processing for determining whether the X-ray examination apparatus 1220 is present within a range viewable by the user of the control apparatus 1210 is not limited to the processing described in the present exemplary embodiment. As another example, the X-ray examination apparatus 1220 is provided with a light emitting unit and the control apparatus 1210 is provided with a light receiving sensor (including an imaging unit). Then, a configuration in which, when the light receiving sensor of the control apparatus 1210 has received a signal emitted from the light emitting unit of the X-ray examination apparatus 1220, the control apparatus 1210 determines that the X-ray examination apparatus 1220 is present within a range viewable by the user can be employed.

While the present disclosure has been described above in detail based on various exemplary embodiments, the present disclosure s not limited to these specific exemplary embodiments, but various configurations in the range not departing from the scope of the present disclosure are applicable. Some of the above-described exemplary embodiments can be combined as appropriate.

The case of supplying a program of software for implementing the functions of the above-described exemplary embodiments to a system or apparatus including a computer that executes the program directly or via wired or wireless communication from a recording medium and causing the computer to execute the program is also included in the present disclosure. Accordingly, program code itself supplied to and installed on a computer to implement control processing in the present disclosure with the computer also implements the present disclosure. In other words, a computer program for implementing control processing in the present disclosure is also included in the present disclosure. In that case, any form of program, such as object code, a program to be executed by an interpreter, or script data to be supplied to an operating system (OS), can be employed as long as it has the function of a program.

As a recording medium for supplying a program, for example, a magnetic recording medium such as a hard disk or a magnetic tape, an optical or magneto optical storage medium, or a non-volatile semiconductor memory can be employed. As a method for supplying a program, such a method as to store a computer program of the present disclosure in a server on a computer network and cause a connected client computer to download the computer program can also be used.

According to the present disclosure, a task intended by the user can be executed while, with an efficient and simple operation, the task is prevented from being executed in response to a touch unintended by the user.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-186612 filed Sep. 27, 2017, which is hereby incorporated by reference herein in its entirety.

What is claimed is:

1. An information processing apparatus comprising:
a touch display; and
at least one processor configured to function as:
a display control unit configured to perform control to display, on the touch display, a first graphical user interface (GUI) corresponding to a task and to display, on the touch display, a second GUI related to execution of the task in a case where a touch-down operation on the first GUI has been performed, and to perform control, in a case where a continuing operation on the second GUI has been started following the touch-down operation, to sequentially display, on the touch display, a plurality of pop-up screens showing setting values different in type with respect to the task based on an amount of continuation of the continuing operation until the continuing operation is completed; and a task control unit configured to perform control to execute the task with displayed setting values in a case where the continuing operation on the second GUI has been completed and not to execute the task in a case where a touch-up operation has been performed before the continuing operation is completed, wherein the second GUI is a slider bar.

2. The information processing apparatus according to claim 1, wherein the first GUI is a button image indicating the task.

3. The information processing apparatus according to claim 1,
wherein the continuing operation is a movement operation to move an operation element on the touch display, and
wherein the second GUI is an image indicating a path of the continuing operation.

4. The information processing apparatus according to claim 3, wherein the display control unit performs control to display a plurality of first GUIs corresponding to respective different tasks, and to display the second GUI with a path differing between a case where a touch-down operation on a first GUI corresponding to a first task has been performed and a case where a touch-down operation on a first GUI corresponding to a second task different from the first task has been performed.

5. The information processing apparatus according to claim 3, wherein the display control unit performs control to sequentially display the path based on movement of a touch position.

6. The information processing apparatus according to claim 1, wherein the amount of continuation is an amount of movement.

7. The information processing apparatus according to claim 1, wherein the amount of continuation is a duration time.

8. The information processing apparatus according to claim 1,
wherein the display control unit performs control to display a screen for receiving an instruction for changing of the setting value in a case where a touch-up operation has been performed when the setting value is being displayed, and
wherein, in a case where the instruction for changing of the setting value has been received, the task control unit changes the setting value of the task based on the instruction for changing.

9. The information processing apparatus according to claim 1, wherein the task includes data transmission to be performed by a multifunction peripheral.

10. The information processing apparatus according to claim 1, wherein the task includes at least one function of an exposure to be performed by an X-ray examination apparatus.

11. The information processing apparatus according to claim 1, wherein the at least one processor is further configured to function as an imaging unit,
wherein, in a case where the imaging unit has captured an image of an execution apparatus that executes the task, the task control unit performs control to execute the task when the continuing operation has completed.

12. A control method comprising:
a display control process of performing control to display, on a touch display, a first graphical user interface (GUI) corresponding to a task and to display, on the touch display, a second GUI related to execution of the task in a case where a touch-down operation on the first GUI has been performed, and performing control, in a case where a continuing operation has started following the touch-down operation, to sequentially display, on the touch display, a plurality of pop-up screens showing setting values different in type with respect to the task based on an amount of continuation of the continuing operation until the continuing operation is completed; and a task control process of performing control to execute the task with displayed setting values in a case where the continuing operation on the second GUI has been completed and not to execute the task in a case where a touch-up operation has been performed before the continuing operation is completed, wherein the second GUI is a slider bar.

13. The control method according to claim 12,
wherein the continuing operation is a movement operation to move an operation element on the touch display, and
wherein the second GUI is an image indicating a path of the continuing operation.

14. The control method according to claim 13, wherein the display control process includes performing control to display a plurality of first GUIs corresponding to respective different tasks, and to display the second GUI with a path differing between a case where a touch-down operation on a first GUI corresponding to a first task has been performed and a case where a touch-down operation on a first GUI corresponding to a second task different from the first task has been performed.

15. The control method according to claim 13, wherein the display control process includes performing control to sequentially display the path based on movement of a touch position.

16. The control method according to claim 12,
wherein the display control process includes performing control to display a screen for receiving an instruction for changing of the setting value in a case where a touch-up operation has been performed when the setting value is being displayed, and
wherein, in a case where the instruction for changing of the setting value has been received, the task control process includes changing the setting value of the task according to the instruction for changing.

17. The control method according to claim 12, wherein the task includes data transmission to be performed by a multifunction peripheral.

18. The control method according to claim 12, wherein the task includes at least one function of an exposure to be performed by an X-ray examination apparatus.

19. The control method according to claim 12, further comprising an imaging process,
wherein, in a case where an image of an execution apparatus that executes the task has been captured by the imaging process, the task control process includes performing control to execute the task when the continuing operation has completed.

20. A non-transitory computer-readable storage medium storing computer-executable instructions that, when executed by a computer, cause the computer to perform a method comprising:
a display control process of performing control to display, on a touch display, a first graphical user interface (GUI) corresponding to a task and to display, on the touch display, a second GUI related to the task in a case where a touch-down operation on the first GUI has been performed, and performing control, in a case where a continuing operation has started following the touch-down operation, to sequentially display, on the touch display, a plurality of pop-up screens showing setting values different in type with respect to the task based on an amount of continuation of the continuing operation until the continuing operation is completed; and a task control process of performing control to execute the task with displayed setting values in a case where the continuing operation on the second GUI has been completed and not to execute the task in a case where a touch-up operation has been performed before the continuing operation is completed, wherein the second GUI is a slider bar.

\* \* \* \* \*